3,065,698
ANNULAR LIQUID PRESSURE TANK WITH
ANNULAR SEPARATOR FLOAT
Homer L. Andrew, Superior, Wis., assignor to Duplex
Manufacturing Company, Superior, Wis.
Filed Aug. 11, 1960, Ser. No. 49,025
1 Claim. (Cl. 103—1)

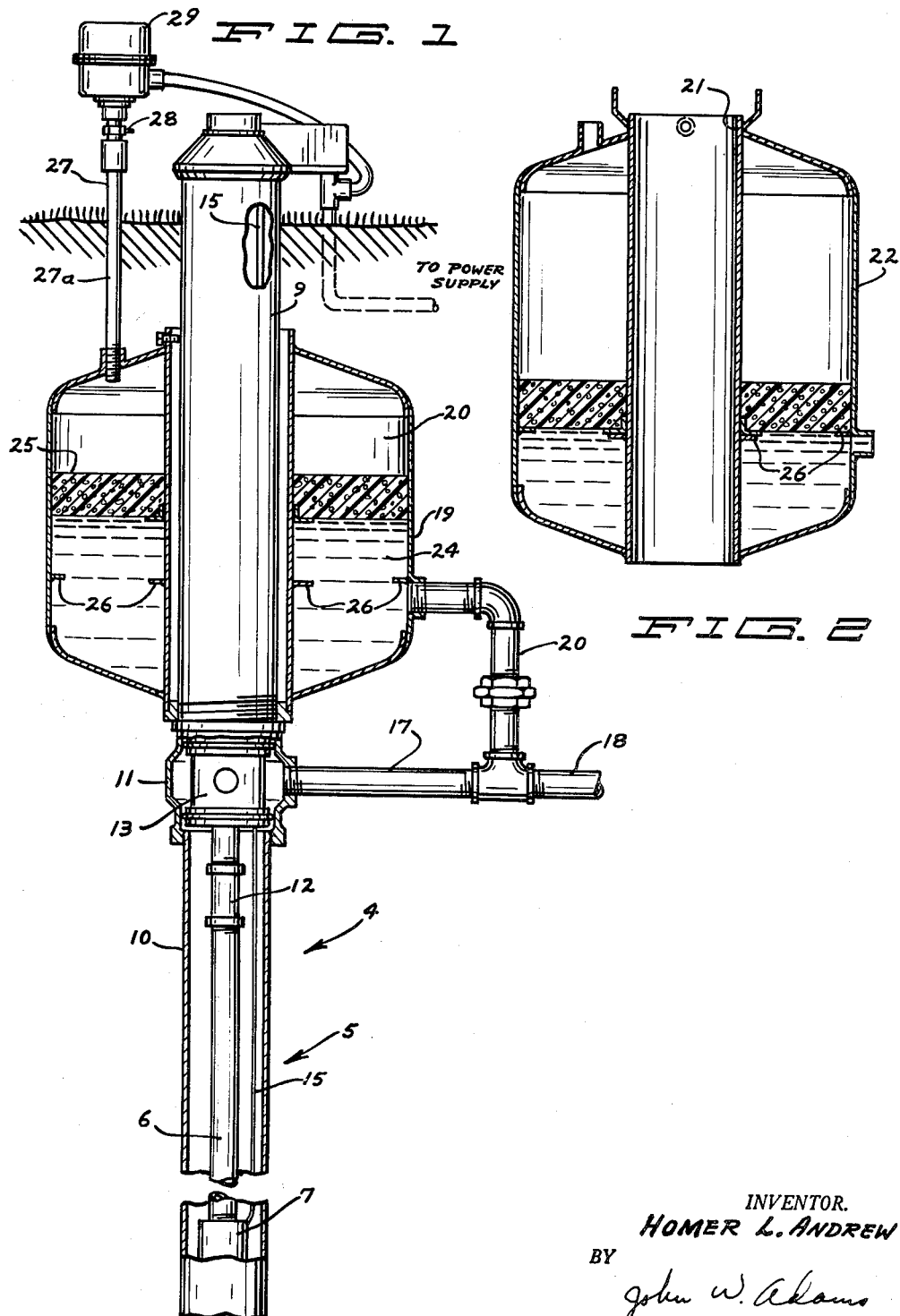
Nov. 27, 1962  H. L. ANDREW  3,065,698
ANNULAR LIQUID PRESSURE TANK WITH ANNULAR SEPARATOR FLOAT
Filed Aug. 11, 1960
INVENTOR.
HOMER L. ANDREW
BY
John W. Adams
ATTORNEY United States Patent Office 3,065,698
Patented Nov. 27, 1962

This invention relates generally to liquid pressure tanks and more particularly to an annular tank and water supply system such as is disclosed in the previously filed co-pending application, Ser. No. 21,431, filed April 11, 1960, and provided with a substantially impervious annular separator float for separating the air from the surface of the water within the tank to prevent or retard absorption of the air by the water and to permit the quantity of precharged air to be maintained substantially constant for relatively long periods of time and thereby to eliminate the necessity of continuously recharging the tank with air.

Briefly, in accordance with the present invention, a substantially impervious disk, lighter than water, or any other liquid which may be stored in the pressure chamber, is placed in the pressure chamber and is arranged to provide a floating barrier between the liquid and the gaseous fluid cushion, for example air, thereabove. Air losses are substantially minimized because of the lack of direct communication between the air and the liquid. Accordingly, the provision of the permanent disk in the pressure tank eliminates the need of automatic air supply which may, in some instances, oversupply air and in other instances may undersupply air. Since the air volume control devices normally require installation in a specific location in the tank and are sensitive to water turbulence, fatiguing may occur which ultimately causes a fracture to occur in certain components of the volume control system. Utilizing the annular tank construction, and utilizing a barrier member which has a matching configuration, an extended operating and guiding range is available throughout substantially the full length of the tank. Air, as needed, may be manually introduced into the tank. With close control of the air volume, a smaller tank may be employed than would otherwise be required for a particular installation and since it is desirable to keep the tank buried to as low a depth as possible consistent with the frost protection required, the shorter tank length is practical.

Because of the configuration of the tank in combination with the floating disk, the inner annular conduit forms a guide controlling the rise of the disk and accordingly maintains it in centered relationship relative to the chamber, thereby minimizing the circumferential clearance which would otherwise eliminate the effectiveness of the annular disk. This clearance is necessary to keep the disk from binding during its reciprocal upward and downward movement. The clearance required in the inner annular tube is essentially a minimum, for example, 3/32" for a tank having a diameter of 24" with a 7⅝" diameter and may be made exceedingly small if a bearing hub is provided along the surface of the float member. Inasmuch as the tank assembly is not part of the well or the well casing, the complete tank assembly may be removed without disturbing the internal components of the well mechanism, the tank assembly including as a component thereof, the complete air supply system.

It is an object of the present invention to provide an annular separator float for annular liquid tanks which maintains the air or other gaseous fluid within the tank separate from the liquid to prevent absorption and resulting loss of air supply, thus eliminating the need for a continuous automatic air supply system operated in respect to the operation of the supply pump.

More specifically it is an object to provide an annular float type separator which is designed to ride up and down within the tank in accordance with the liquid level therein and to be closely guided not only around the outward periphery thereof but also around the inner periphery in order to insure level positioning of the float at all times within the tank and prevent binding thereof not only after installation but also during shipping and storing of the tank before installation.

These and other objects and advantages of this invention will more fully appear from the following description made in connection with the accompanying drawing, wherein like reference characters refer to the same or similar parts throughout the several views, and in which:

FIG. 1 is a vertical sectional view partially broken away showing an embodiment of my invention; and, FIG. 2 is a detail vertical sectional view of a storage tank per se embodying the present invention.

In accordance with the preferred embodiment of the present invention, the well and water supply arrangement generally designated 4 has a casing generally designated 5 which extends from a point substantially adjacent the top surface of the soil down to a point in the subterranean water supply. A drop-pipe 6 is provided coaxially within the casing 5 and extends to the pump 7, this pump preferably being a submersible type. Of course, it will be appreciated that other pumping means or mechanism may be utilized such as a reciprocating pump, a jet pump or the like, all of these being conventionally employed in the art and utilized in their normal manner herein. The casing 5 includes an upper segment 9 and a lower segment 10, the two segments being joined at the T-coupling 11 housing a distribution head 13. The assembly is provided with a check valve 12 which is arranged between the pump 7 and the distribution head 13, and maintains the system under pressure. Of course, the valve may be disposed in the distribution head, if desired. Within the annular space between the drop-pipe 6 and the casing 5, a suitable conduit or the like 15 for providing electrical power to the pump 7 is provided. In communication with the distribution head 13, a discharge or delivery conduit 17 is provided and is arranged to deliver water either directly through the delivery conduit 18 or into the pressure storage tank 19 by way of the conduit or pipe system 20, as determined by the immediate draw-requirements of the system associated therewith. The tank 19 defines an annular chamber 20 which is adapted to be received over the casing 5, such as the casing section 9, this tank having an inner annular wall 21 and an outer annular wall 22. Also provided is a conventional pressure sensing mechanism 29 which as is conventional, is adapted to sense the pressure within the chamber through chamber extension pipe 28, and control the flow of power to the pump 7 accordingly. The water supply as shown at 24 is separated from the conventional air cushion or air supply by means of the substantially impervious float member 25, float member 25 being fabricated from a suitable impervious material such as a frothed resinous material having closed-cell construction such as, for example, frothed polystyrene, frothed polyethylene or the like. The barrier member 25 has an inner and outer periphery which substantially matches the inner and outer periphery of the annular chamber 20 and is accordingly free to rise and fall in accordance with the water level maintained therein. A normal water level is shown in FIG. 1, this being a suitable upper level to be maintained for operation of the system, the lower suitable operating level being shown in FIG. 2. Annular cleats or shoulders 26—26 are shown and are arranged to prevent the float member 25 from falling to a level below which the contour of the tank will not permit without becoming jammed therein should the inlet pipe be inserted too far within the confines of the chamber.

In operation, therefore, upon a call for water, the pressure switch 29 energizes the pump 7 and causes water to enter the distribution head 11 and flow through conduit 17 and eventually into the tank 19. Water will continue to enter the tank 19 until a sufficient predetermined pressure is built up within the chamber 20, at which point the switch 29 will de-energize pump 7. The condition will remain static until the demands of the water supply system being met lower the supply to a point such as is illustrated in FIG. 2 at which point the pressure switch 29 will again energize and the sequence is repeated.

Barrier member 25 will maintain the air supply at a substantially constant volume for an extended period of time. Therefore, it is no longer necessary to include an automatic air supply system that is subject to periodic service, the servicing in some instances being at a time when the installation may be inaccessible to the required equipment due to weather conditions or the like.

Air, when needed, is merely pumped through the valve 28 and thus ultimately into the pressure chamber 20. The chamber extension pipe 27 is hollow and accordingly provides a communicating channel 27a between the valve 28 and the chamber 20. The valve 28 is preferably a self-closing air valve and the conduit 27a is preferably an interlined tube that provides adequate protection from internal freezing damage.

It will, of course, be understood that various changes may be made in the form, details, arrangements and proportion of parts without departing from the scope of my invention, which generally stated consists in the matter set forth in the appended claim.

What is claimed is:

A hydraulic pneumatic pressure storage system for a well unit including a casing with a certain predetermined outer diameter and extending substantially from the ground surface to a subterranean water source, pumping means disposed within said casing and communicating with said subterranean water source, an annular tank unit arranged about said casing and having an inner cylindrical wall defining a central opening having a diameter exceeding the predetermined outer diameter of the casing whereby the annular tank unit may be readily mounted on and removed from said casing, an inlet and discharge opening in the side wall of said tank disposed in spaced relation above the bottom thereof, an external conduit communicating with a discharge point and coupled to said tank at said opening and having fluid communication with the pump discharge to afford communication between said pump and said tank and said discharge point, an annular float member having an inner diameter substantially equal to that of the outer diameter of the inner cylindrical wall of said tank and an outer diameter substantially equal to that of the inner periphery of the outer tank wall, both of said diameters being such as to permit free rising and falling of the annular float within the tank, an annular shoulder member fixed to the inner surface of said outer tank wall and extending inwardly therefrom at a plane disposed above the opening in said tank and a second annular shoulder fixed to the outer surface of the inner cylindrical wall and lying in substantially the same plane as said outer shoulder to provide positive support for said float above the opening in the tank wall and thus maintain the float above said opening regardless of the water level in the tank.

References Cited in the file of this patent

UNITED STATES PATENTS

| | | |
|---|---|---|
| 1,116,414 | Gould | Nov. 10, 1914 |
| 2,056,076 | LeBlanc | Sept. 29, 1936 |
| 2,787,220 | Patterson et al. | Apr. 2, 1957 |
| 3,030,891 | Taylor | Apr. 24, 1962 |

FOREIGN PATENTS

| | | |
|---|---|---|
| 12,573 | Great Britain | Sept. 1, 1915 |
| 1,137,430 | France | Jan. 14, 1957 |

UNITED STATES PATENT OFFICE
CERTIFICATE OF CORRECTION

Patent No. 3,065,698            November 27, 1962

Homer L. Andrew

It is hereby certified that error appears in the above numbered patent requiring correction and that the said Letters Patent should read as corrected below.

Column 1, line 59, before "and" insert -- flue --; column 2, line 53, for "28" read -- 27 --.

Signed and sealed this 7th day of May 1963.

(SEAL)
Attest:

ERNEST W. SWIDER
Attesting Officer

DAVID L. LADD
Commissioner of Patents